United States Patent
Namdeo et al.

(10) Patent No.: US 12,345,527 B1
(45) Date of Patent: Jul. 1, 2025

(54) CAPACITIVE SENSING RING-SIZING SYSTEM AND A METHOD THEREOF

(71) Applicant: ULTRAHUMAN HEALTHCARE PVT LTD, Bangalore (IN)

(72) Inventors: Yogansh Namdeo, Abu Dhabi (AE); Syed Hisham, Abu Dhabi (AE); Adhit Shet, Abu Dhabi (AE); Ritwik Raj, Abu Dhabi (AE); Vatsal Singhal, Abu Dhabi (AE); Mohit Kumar, Abu Dhabi (AE)

(73) Assignee: ULTRAHUMAN HEALTHCARE PVT LTD, Bangalore (IN)

( * ) Notice: Subject to any disclaimer, the term of this patent is extended or adjusted under 35 U.S.C. 154(b) by 0 days.

(21) Appl. No.: 19/062,845

(22) Filed: Feb. 25, 2025

(51) Int. Cl.
*G01B 7/12* (2006.01)

(52) U.S. Cl.
CPC ..................... *G01B 7/12* (2013.01)

(58) Field of Classification Search
CPC ................... G01B 7/12; G01B 3/34
USPC ................. 33/514.1, 555.1, 555.2
See application file for complete search history.

(56) References Cited

U.S. PATENT DOCUMENTS

| | | | | |
|---|---|---|---|---|
| 1,212,279 A * | 1/1917 | Stone | ..................... | G01C 11/00 33/1 A |
| 1,213,607 A * | 1/1917 | Engelsman | .............. | G01B 3/34 33/679.1 |
| 3,548,506 A * | 12/1970 | Harrington | .............. | G01B 3/34 D10/64 |
| 3,858,325 A * | 1/1975 | Goerler | ..................... | G01B 3/36 D10/64 |
| 4,107,850 A * | 8/1978 | Adler | ........................ | G01B 3/38 33/542 |
| 4,112,355 A * | 9/1978 | Gibson, Jr. | ............. | G01R 31/50 324/609 |
| 4,138,820 A * | 2/1979 | O'Connor | ................ | G01B 3/34 33/562 |
| 4,958,442 A * | 9/1990 | Eckhardt | .................. | G01B 5/08 33/783 |
| 6,047,606 A * | 4/2000 | Sibole | ....................... | G01B 3/30 73/865.8 |
| 6,481,115 B1 * | 11/2002 | Henshaw | ........... | G01D 5/34738 33/645 |
| 7,984,850 B2 * | 7/2011 | Santos | ...................... | G01B 3/34 235/375 |

(Continued)

FOREIGN PATENT DOCUMENTS

KR 102069278 B1 3/2020

*Primary Examiner* — George B Bennett
(74) *Attorney, Agent, or Firm* — Mannava & Kang, P.C.

(57) ABSTRACT

Present disclosure discloses a capacitive sensing ring-sizing system. The capacitive sensing ring-sizing system is an advanced device that revolutionizes the ring sizing experience through its integration of sensor technology, wired rings, and a custom-built electronic system. It provides real-time feedback on ring fit, enabling users to find their perfect size with precision and simplicity. According to an embodiment, the capacitive sensing ring-sizing system uses capacitive sensors embedded in the ring to determine how well the ring fits on a finger. Rather than taking physical measurements of the finger size like circumference or diameter, the capacitive sensing ring-sizing system uses changes in capacitance caused by the interaction between the ring, the finger, and the skin's dielectric properties.

16 Claims, 8 Drawing Sheets

(56) References Cited

U.S. PATENT DOCUMENTS

| | | | |
|---|---|---|---|
| 8,800,153 B2* | 8/2014 | Steinich | G01D 5/24442 33/1 PT |
| 9,146,104 B2* | 9/2015 | Smith | G01C 9/10 |
| 11,274,911 B1* | 3/2022 | Chang | G01B 5/213 |
| 11,448,495 B2* | 9/2022 | Combs | G01B 7/02 |
| 2023/0324161 A1* | 10/2023 | Yamaji | G01B 5/12 33/542 |
| 2024/0353212 A1 | 10/2024 | Parison et al. | |

* cited by examiner

CAPACITIVE SENSING RING-SIZING SYSTEM AND A METHOD THEREOF

FIELD OF INVENTION

The present disclosure relates to a capacitive sensing ring-sizing system. In particular, the present disclosure relates to the capacitive sensing ring-sizing system to determine the size of a ring using capacitive sensors.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditional methods of ring sizing rely on manual tools and subjective evaluation, which often result in inconsistent outcomes and dissatisfaction among customers. These techniques are labor-intensive, lack accuracy, and do not meet the demands of today's consumers in both retail and online environments. While digital solutions offer virtual sizing through smartphones using circumference measurements, they heavily depend on user input and proper placement, which can lead to errors. Additionally, their reliance on smartphones restricts accessibility in physical retail locations.

Moreover, these tools fail to consider the anatomical intricacies of the human finger, which is not uniformly cylindrical, but instead varies in form due to skeletal structure, muscles, and soft tissues. Consequently, circumference measurements can lead to a mechanical fit that neglects important factors such as comfort, pressure distribution, and ease of sliding over the knuckle.

Manual tools, as explained in some of the conventional systems such as traditional ring sizers and adjustable band gauges, do not provide real-time data processing or actionable feedback. For example, the adjustable band gauges rely on manual tightening and visual assessment, which can result in subjective errors and inconsistent outcomes. Further, the conventional tools like tapered ring sizers can accommodate irregular ring shapes however, the tapered ring sizers require manual effort and do not offer dynamic feedback regarding fit or user comfort. Furthermore, the mechanical components of the conventional system may deteriorate, thereby compromising their reliability. These limitations render such tools inadequate for contemporary needs, where precision, durability, and user-friendly solutions are essential.

Further, the conventional system may include lots of computation for determining the sizing of the system. For example, the conventional electronic ring sizing systems generally utilize multiple sophisticated computational methods, including 3D scanning, image processing, and possibly machine learning, to enhance accuracy and user experience. However, these involve a huge amount of computation and implementation of heavy ML models in the system.

Thus, there is a need to provide a ring-sizing system that overcomes the above drawbacks.

SUMMARY OF THE INVENTION

In general, embodiments of the present disclosure discloses a capacitive ring-sizing system for measuring the ring size using capacitive sensors. Other implementations will be or will become, apparent to one with skill in the art upon examination of the following figures and detailed description. It is intended that all such additional implementations be included within this description within the scope of the disclosure.

The present disclosure provides a method implemented in a capacitive sensing ring-sizing system. The method comprises receiving sensor data, from a capacitive sensor embeds in a first ring, upon trial of the first ring on a finger of a user, where the first ring is selected by the user from a set of rings that is installed in a ring panel of the capacitive sensing ring-sizing system, and each ring of the set of rings is of different standard sizes and embeds with the capacitive sensor. The method further comprises measuring a capacitance shift and a pressure at a plurality of pressure points with respect to a skin of the finger based on the sensor data. The method further comprises evaluating the capacitance shift and the plurality of pressure points with respect to a predefined sizing parameters. Further, the method comprises determining fit characteristics with respect to the selected first ring based on the evaluation of the capacitance shift and the plurality of pressure points. Further, the method comprises providing, via a user interface, a response about the size of the first ring based on the fit characteristics.

According to another embodiment, the capacitive sensing ring-sizing system is disclosed. The capacitive sensing ring-sizing system include a ring panel having a set of rings where each ring is of different sizes and embeds with the capacitive sensor. The capacitive sensing ring-sizing system includes a receiving unit configured to receive sensor data from the each ring. Further, the capacitive sensing ring-sizing system comprises a processing unit comprising one or more processors. Further, the capacitive sensing ring-sizing system comprises a display unit configured to display a user interface to a user. In an embodiment, the processing unit is configured to receive the sensor data, from the capacitive sensor embeds in a first ring, upon trial of the first ring on a finger of the user, where the first ring is selected by the user from the set of rings that is installed in the ring panel. Further, the processing unit is configured to measure a capacitance shift and a pressure at a plurality of pressure points with respect to a skin of the finger based on the sensor data. Further, the processing unit is configured to evaluate the capacitance shift and the plurality of pressure points with respect to a predefined sizing parameters. Further, the processing unit is configured to determine fit characteristics with respect to the selected first ring based on the evaluation of the capacitance shift and the plurality of pressure points. Further, the processing unit is configured to provide, via the user interface, a response about the size of the first ring based on the fit characteristics.

The above summary is provided merely for the purpose of summarizing some exemplary embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

DESCRIPTION OF THE DRAWINGS

Figure 1A:
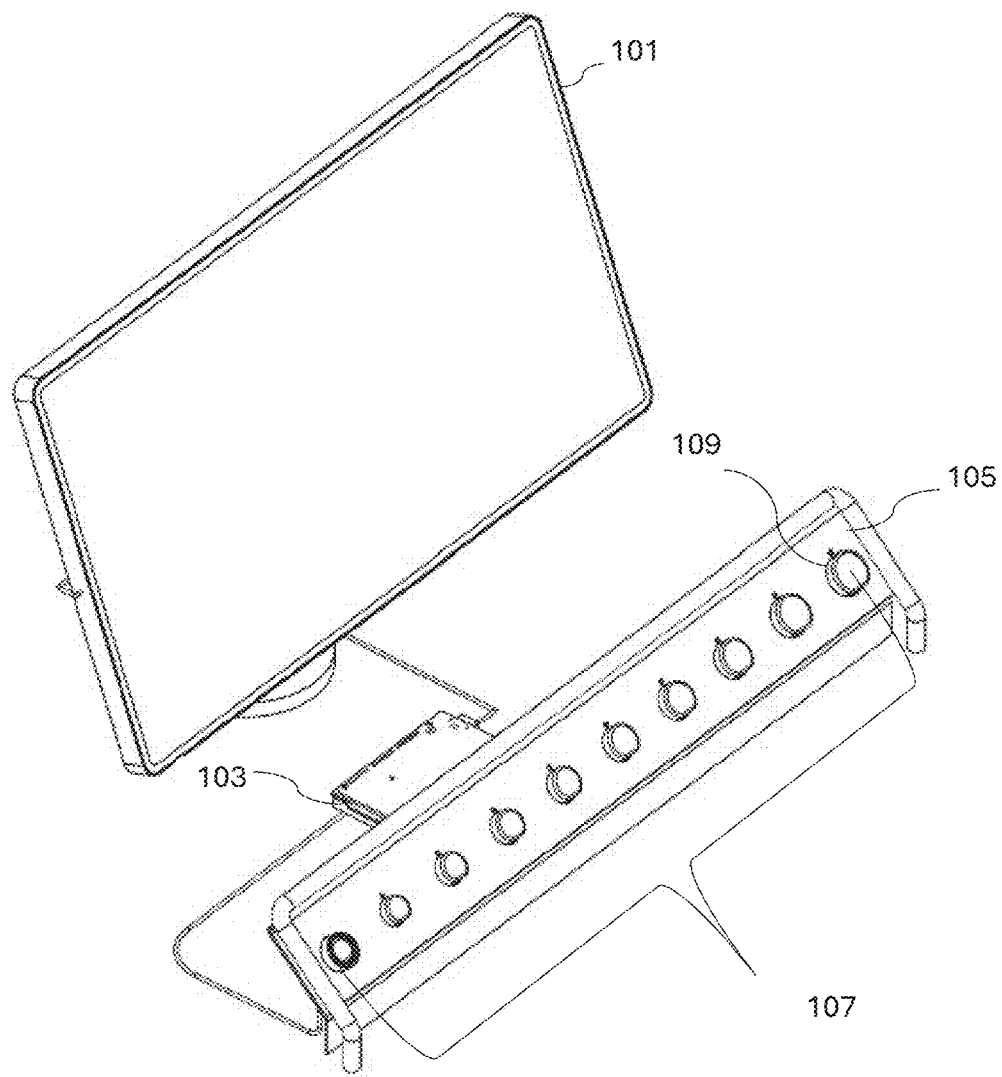
Figure 1B:
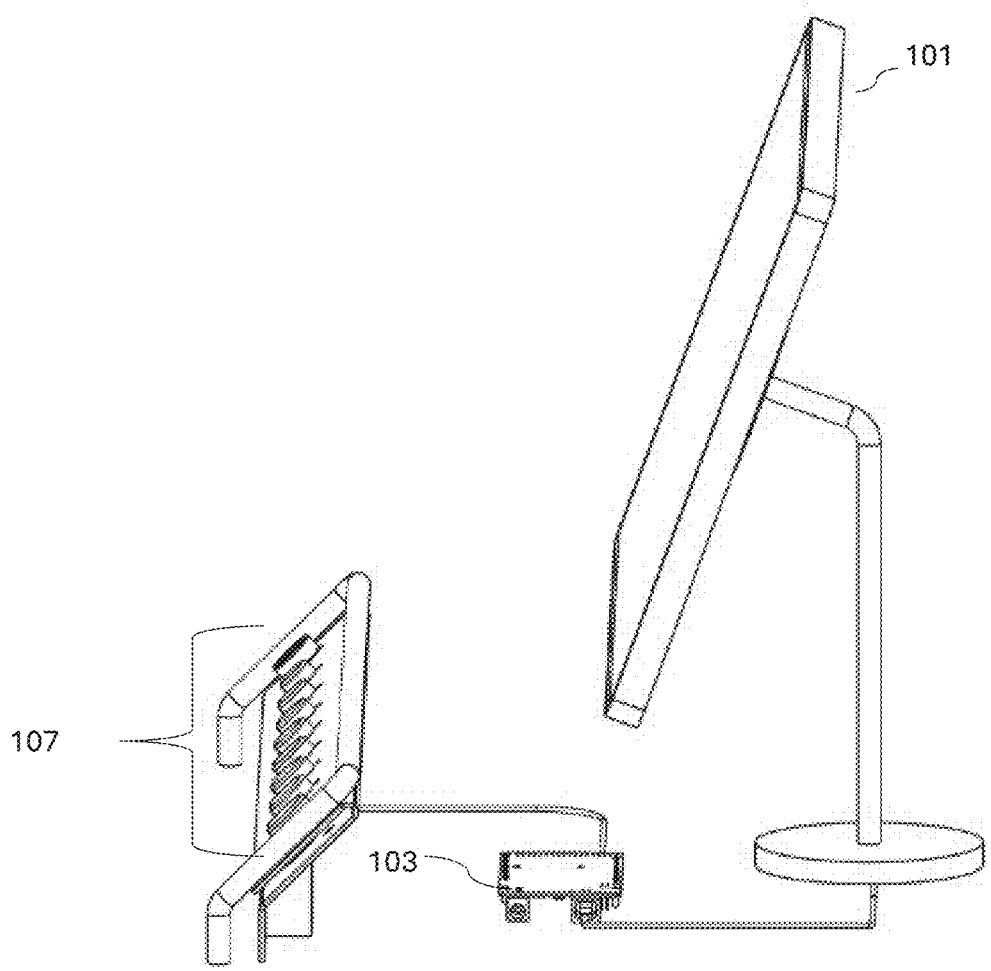
Figure 1C:
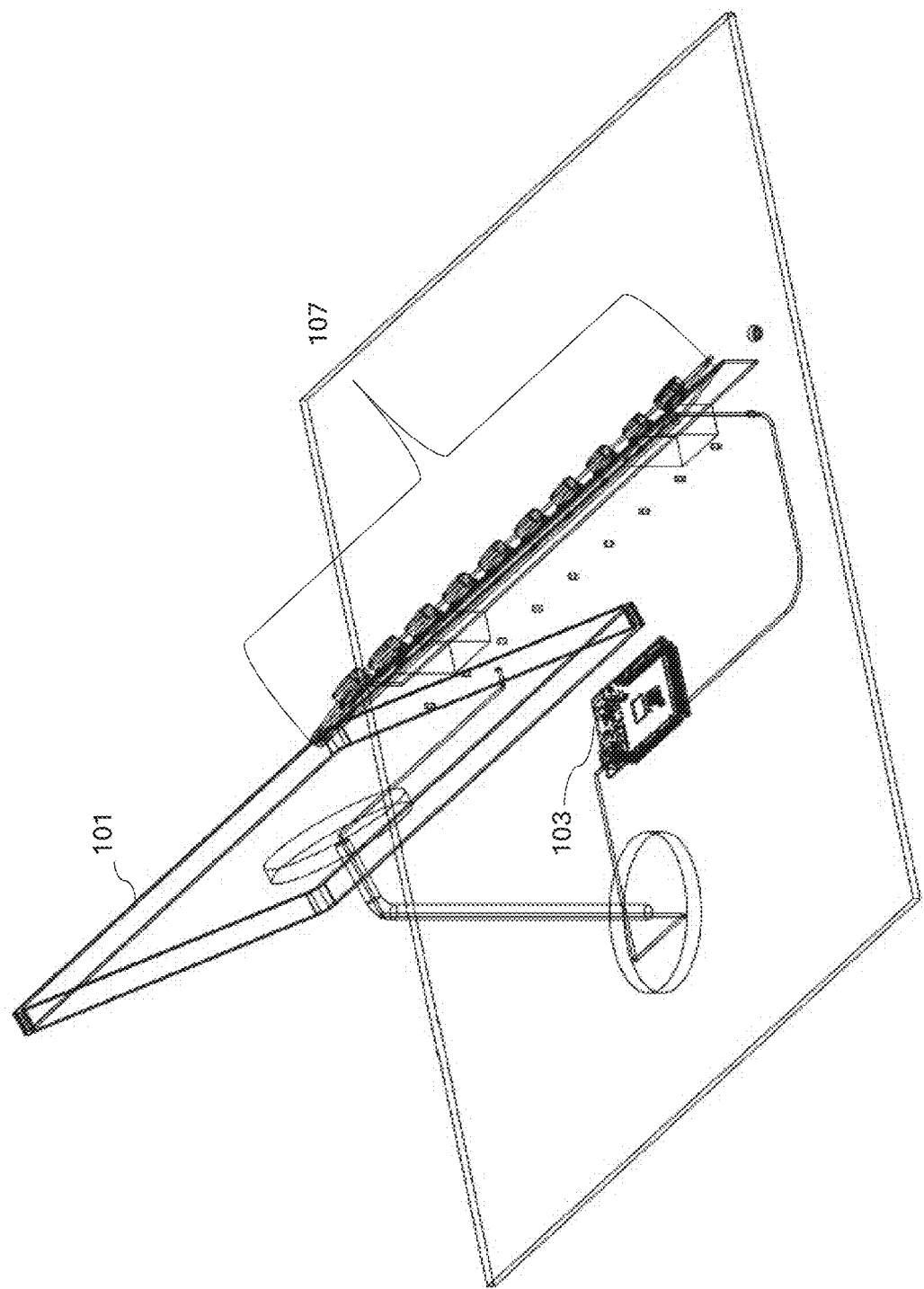
Figure 2:
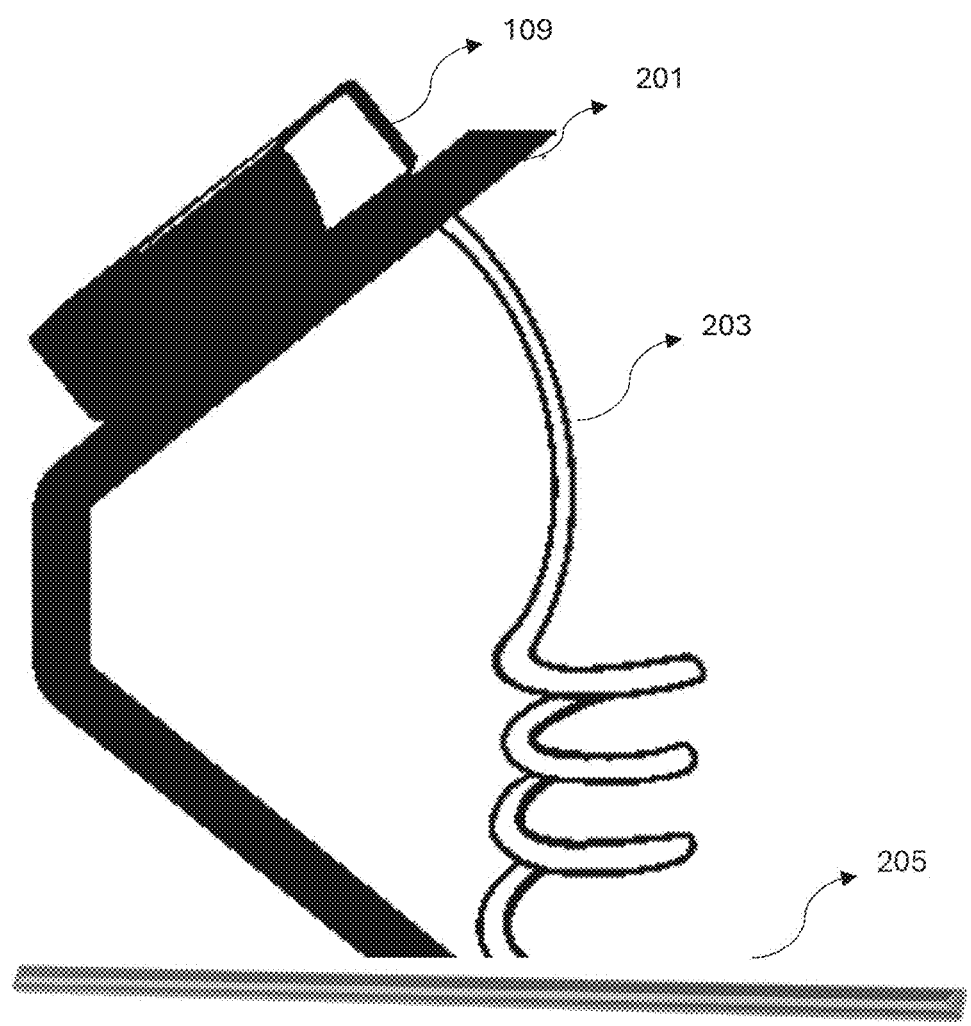
Figure 3:
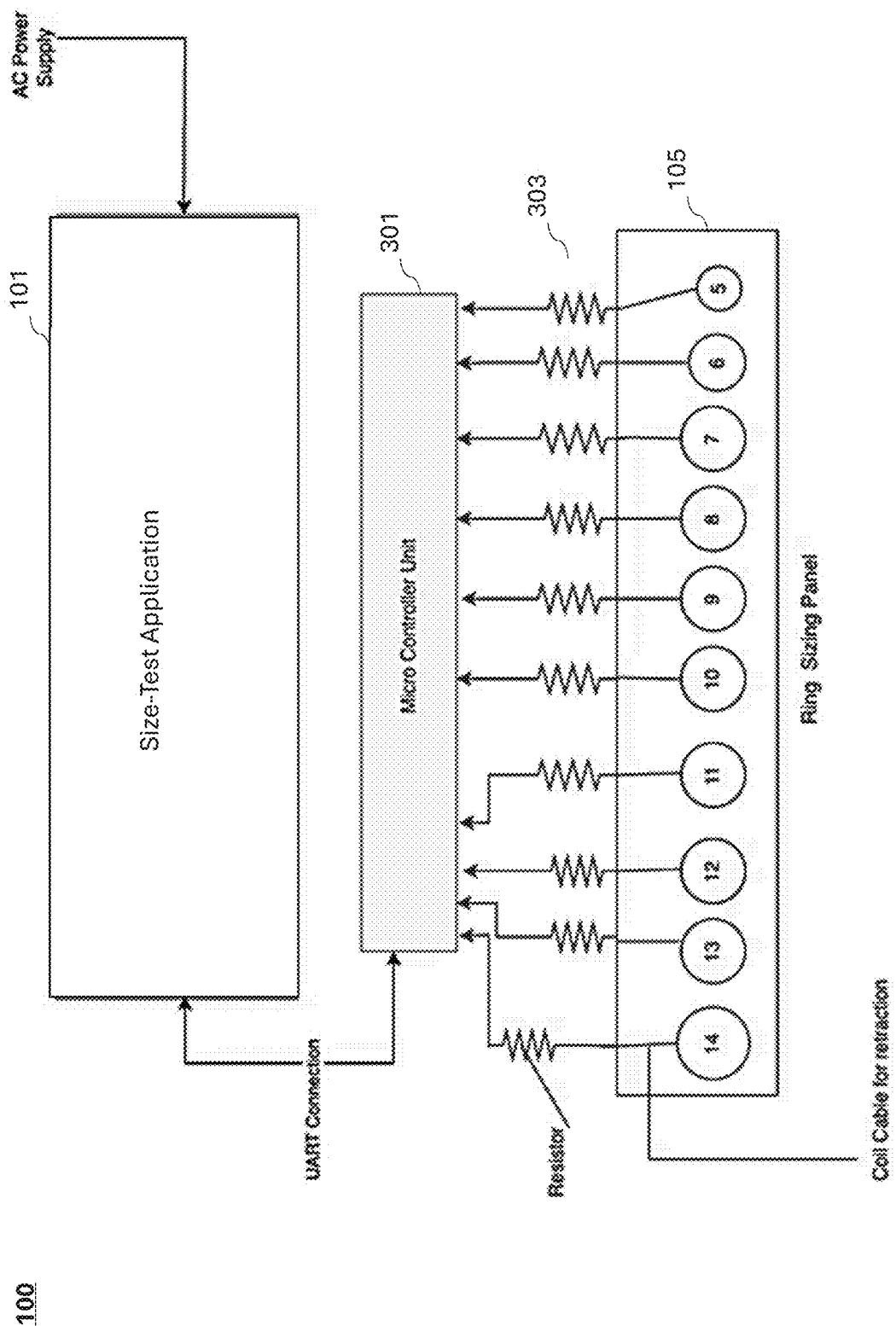
Figure 4:
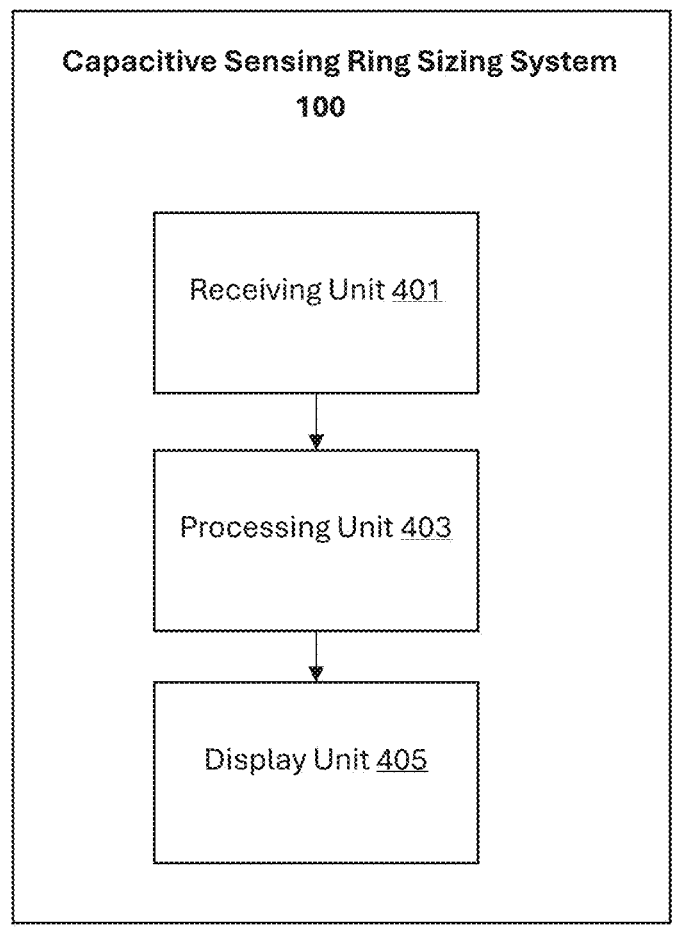
Figure 5:
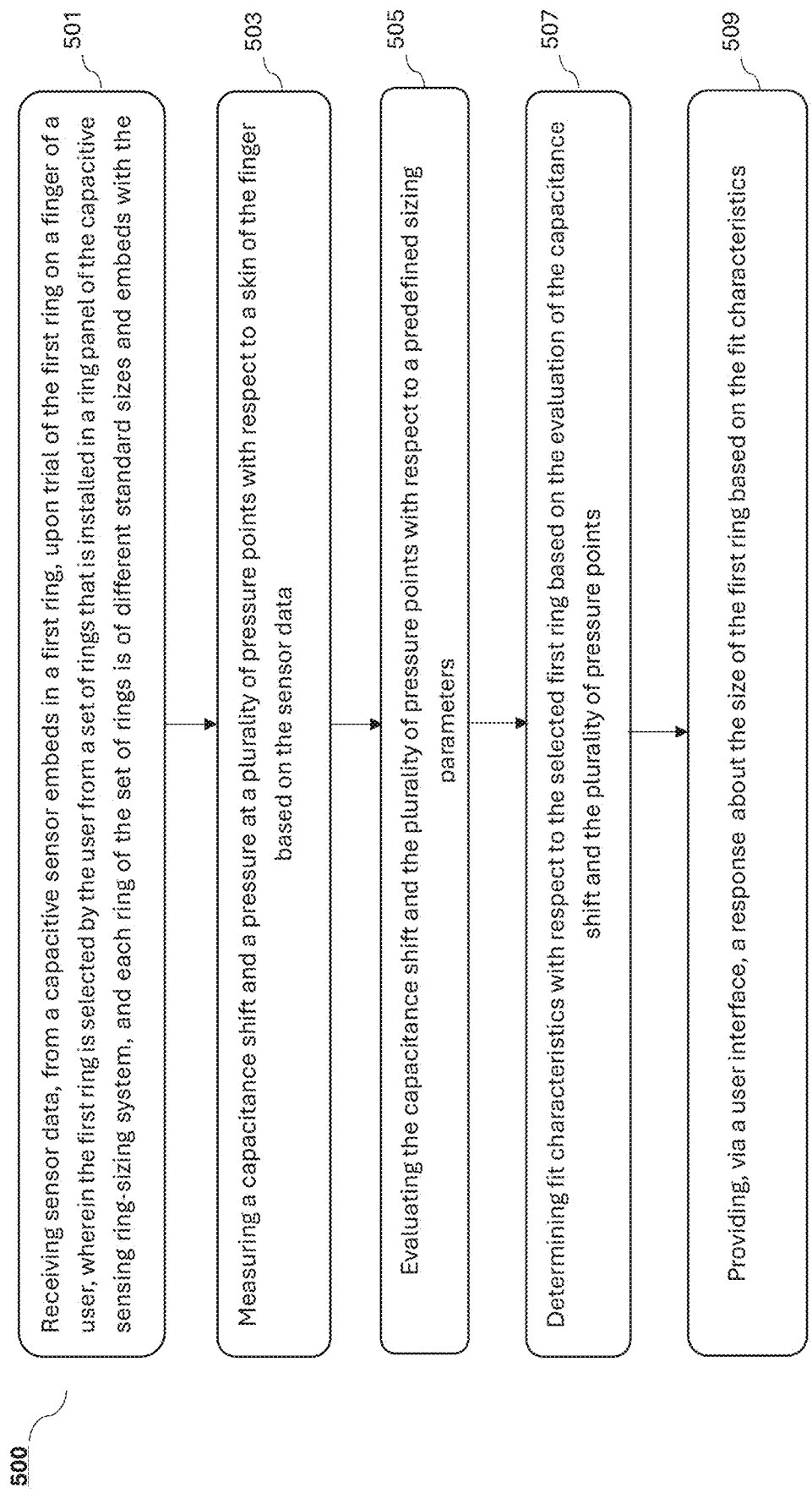
Figure 6:
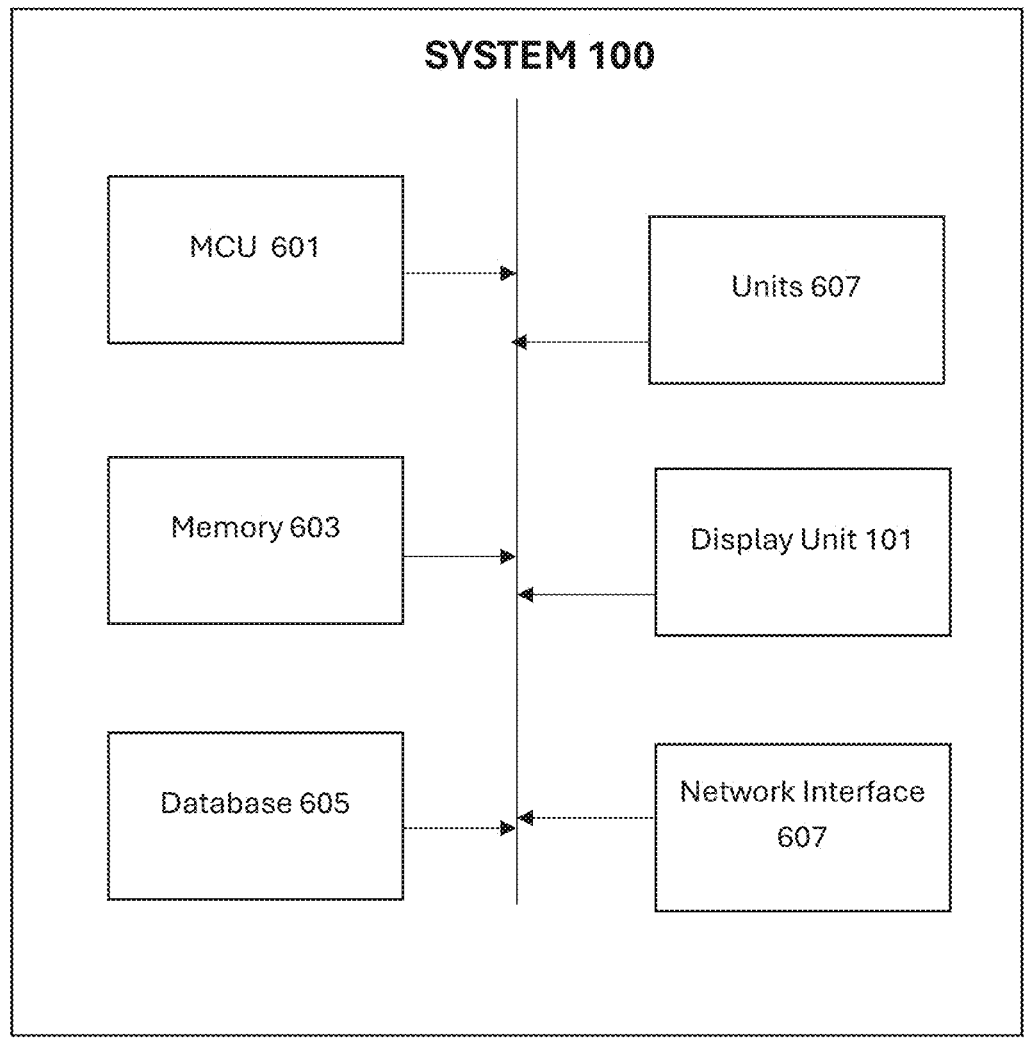

Having thus described the embodiments of the disclosure in general terms, reference now will be made to the accompanying drawings, which are not necessarily drawn to scale, and wherein:

FIGS. 1A-1C illustrates a capacitive sensing ring-sizing system 100, according to an embodiment of the present disclosure;

FIG. 2 illustrates a detailed circuit diagram 200 of a capacitive sensing ring, according to an embodiment of the present disclosure;

FIG. 3 illustrates a detailed circuit diagram 300 of capacitive sensing ring-sizing system 100, according to an embodiment of the present disclosure;

FIG. 4 illustrates various units of the capacitive sensing ring-sizing system, according to an embodiment of the present disclosure;

FIG. 5 illustrates a method 500 implemented in the capacitive sensing ring-sizing system, according to an embodiment of the present disclosure; and FIG. 6 illustrates a general block diagram of capacitive sensing ring-sizing system, according to an embodiment of the present disclosure.

DESCRIPTION OF THE INVENTION

The description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The description includes specific details for the purpose of providing a thorough understanding of the present invention. However, it will be apparent to those skilled in the art that the present invention may be practiced without these specific details. Further, the reference numerals for similar components, modules, units, and operation steps have been kept same for the ease of understanding.

Some embodiments of the present disclosure now will be described with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements.

According to an embodiment, the present disclosure discloses a capacitive sensing ring-sizing system. The capacitive sensing ring-sizing system is an advanced device that revolutionizes the ring sizing experience through its integration of sensor technology, wired rings, and a custom-built electronic system. It provides real-time feedback on ring fit, enabling users to find their perfect size with precision and simplicity. The disclosed capacitive sensing ring-sizing system significantly enhances the customer experience by offering instant, accurate, and data-driven insights, eliminating the limitations of traditional manual sizing methods and existing digital alternatives. A detailed explanation of the same is provided in the below paragraphs.

According to an embodiment, the capacitive sensing ring-sizing system uses capacitive sensors embedded in the ring to determine how well the ring fits on a finger. Rather than taking physical measurements of the finger size like circumference or diameter, the capacitive sensing ring-sizing system uses changes in capacitance caused by the interaction between the ring, the finger, and the skin's dielectric properties.

In principle, the capacitance is the ability of a system to store charge. It depends on the distance between conductors, the area of the conductors, and the dielectric material between them. In this case, the sensor consists of electrodes that form a capacitor, with the finger acting as one of the electrodes. Now, when the ring is placed on a finger, the presence of the skin alters the electric field around the sensor, changing its capacitance. This alteration depends on how closely the skin is positioned to the sensor and how much pressure is applied.

FIGS. 1A-1C illustrates a capacitive sensing ring-sizing system 100, according to an embodiment of the present disclosure. According to an embodiment, the capacitive ring-sizing system 100 includes a display panel 101, an electronic system 103 inbuilt with a ring panel 105 electrically coupled with each other. FIGS. 1A-1C depicts a front view, a side view, and a back view of the capacitive sensing ring-sizing system 100 respectively. In an embodiment, the ring panel 105 includes a set of rings 107 where each ring is of different standard sizes. In an embodiment, each ring from the set of rings 107 may be collectively referred to as 109. According to an embodiment, each ring 109 is embedded with the capacitive sensor to measure finger dimensions and pressure points. According to an embodiment, the electronic system 103 is a custom-built system configured to process sensor data in a real-time. Further, the electronic system 103 is integrated with a display screen that provides immediate feedback on the fit. In an embodiment, the electronic system 103 analyzes sensor data to determine the optimal ring size.

According to an embodiment, the display panel 101 provides an interactive user interface (UI) for selecting a ring 109 from the set of rings 107. Further, the UI displays a response to the user about the size of a first ring that was selected from the set of rings 107 after trial. According to an embodiment, the displays panel 101 displays the responses such as "Perfect Fit," "Too Tight," or "Too Loose" along with a recommendation for the next size to try.

According to an embodiment, in order to determine the size of the ring the user selects a first ring of his preference from the set of rings 107. After choosing their preferred option, the user tries the ring on his finger. In an embodiment, the ring is equipped with the capacitive sensors that gathers real-time sensor data. In particular, the capacitive sensors capture the capacitance value to determine the fit characteristics of the figure with respect to the ring. In an embodiment, the electronic system 103 processes sensor input i.e. the capacitance value, and evaluates the capacitance value against predefined sizing parameters. In a non-limiting example, the predefined sizing parameters may include a predefined capacitance threshold range. In an embodiment, the capacitive sensing ring-sizing system 100 provides an instant response on the display panel 101, guiding the user to try a size up or down as necessary. In case, the size is optimal, the capacitive sensing ring-sizing system 100 the response as the "Perfect Fit.

FIG. 2 illustrates a detailed circuit diagram 200 of a capacitive sensing ring, according to an embodiment of the present disclosure. According to an embodiment, each ring 109 is placed on a ring platform 201. In an embodiment, the capacitive sensors are placed inside the surface of each ring 109 so that when the user tries the ring on his finger, the fit characteristics can be estimated properly. In an embodiment, a ring wire 203 connects each ring 109 along with the ring platform 201 with a display platform 205 of the display panel 105. In an embodiment, based on the determined fit characteristics, the response of the capacitive sensing ring-sizing system is displayed on the display panel.

In an embodiment, when the user puts the ring on their finger, the capacitive sensors measures the capacitance and detect the dielectric changes from the skin. The results are processed, and the fit characteristics with respect to the ring is determined based on the evaluation of a capacitance shift and the plurality of pressure points. For example, the capacitance sensor detects little to no change in capacitance value when the ring is loosely fit. Similarly, the capacitance sensors detect a significant increase in the capacitance value as the skin is pressed against the ring, indicating that the ring is too tight for comfort. Further, a good fit would yield the capacitance value that fall within a specific range, signifying that the ring fits neither too loosely nor too tightly.

FIG. 3 illustrates a detailed circuit diagram 300 of capacitive sensing ring-sizing system 100, according to an embodiment of the present disclosure. According to an embodiment, the electronic system 103 comprises a processing having a micro controller (MCU) unit 301 for processing the sensor data from the ring 109. In an embodiment, each ring is connected with the MCU unit 301 through a resistor for controlling a spike in the current or charge. Further, the MCU unit 301 is connected with the display panel 201 through a UART connection for transmitting and receiving data and signals. In an embodiment, the processing unit is deployed with a size-test application that will be launched upon power up or operating upon an icon button. In an embodiment, the size-test application is displayed on the display panel 101 through the user interface.

According to some embodiment, the size-test application may be deployed on an android device which is communicatively coupled with the capacitive sensing ring-sizing system 100. In such a case, the ring is communicatively coupled with the size-test application via Bluetooth or any communication protocols. Further, the display panel of the android device displays the fit characteristics. The explanation is provided with respect to the capacitive sensing ring-sizing system 100 however, the methodology is applicable for both the devices.

FIG. 4 illustrates various units of the capacitive sensing ring-sizing system, according to an embodiment of the present disclosure. In an embodiment, electronic system 103 comprises a receiving unit 401 coupled with a processing unit 403. Further, the processing unit 403 is coupled with a display unit 305. In an embodiment, the display unit 305 is included in the display panel 105. According to some embodiment, the display panel 105 may be comprised in the android device. The functions of each components will be explained in the forthcoming paragraphs.

Consider a scenario, where the user wanted to determine a size of the ring through the capacitive sensing ring-sizing system. In an embodiment, the ring of various standard sizes are there on the ring panel 105 as depicted in FIG. 3. In an embodiment, the user may initiate a test mode after the launch of the test-size application. Upon the test mode is turned ON, the display unit 405 displays the ring size corresponding to the rings 109 placed on the ring panel 105. In an embodiment, the user may select a ring from the set of rings 107 for trial. Accordingly, the user may insert their finger into the ring to check the fit.

In an embodiment, as the user tries the ring, the receiving unit 301 receives the sensor data, from the capacitive sensor embeds in the ring. In an embodiment, the receiving unit 301 receives the sensor data from the capacitive sensors that are deployed at various points of the ring.

In an embodiment, the processing unit 403 measures a capacitance shift and a pressure at a plurality of pressure points with respect to a skin of the finger based on the sensor data. In an embodiment, for measuring the capacitance shift, the processing unit 403 determines a capacitance value with respect to a contact with the skin based on the sensor data. Further, the processing unit 403 measures the capacitance shift based on a shift in the capacitance value with respect to an initial capacitance value. As explained above, the capacitive sensors work by measuring how much electrical charge they can store. This ability is represented as capacitance. The changes in capacitance can result from the proximity of an object (like a finger) or pressure applied to the capacitor sensor. In an embodiment, the processing unit 403 measures the capacitance shift based on a change in the capacitance value by comparing the initial capacitance value and a final capacitance value with respect to its initial capacitance value.

In an embodiment, for measuring the pressure at the plurality of pressure points of the finger, the processing unit 403 determines the pressure exerted on each of the pressure points of the finger based on the capacitance value at each pressure point. Further, the processing unit 403 measures the pressure at the plurality of pressure points of the finger based on the determination. As the user puts on the ring, the capacitive sensors continuously measure capacitance based on the interaction with the finger. The sensors record how capacitance changes as the pressure applied by the ring alters. For instance, as the finger pushes against the inner surface of the ring, capacitance can be interpreted in the real-time. For example, low pressure corresponds to capacitance readings under a certain level (say 2 pF), a moderate pressure could fall within an identified range (e.g., between 2 pF and 3 pF) and high pressure might be readings above a specific level (e.g., above 3 pF).

Upon measuring the pressure and the capacitance shift, the processing unit 403 evaluates the capacitance shift and the plurality of pressure points with respect to a predefined sizing parameters. In particular, for evaluating the capacitance shift and the plurality of pressure points, the processing unit 403 compares the capacitance shift and the plurality of pressure points with respect to the predefined sizing parameters. In an embodiment, the predefined sizing parameters include a predefined capacitance threshold range. In an embodiment, the processing unit 403 determines a level of fit to determine the fit characteristics based on a result of the comparison. Accordingly, the processing unit 403 identifies whether the first ring is one of a loosely fit, a tightly fit, or a perfectly fit based on the fit characteristics. Table 1 depicts an example of a fit characteristics with respect to the evaluated the capacitance shift and the plurality of pressure points with respect to a predefined sizing parameters.

Accordingly, the fit characteristics of the first ring are identified as the tightly fit when the capacitance shift and each pressure point is more than the predefined capacitance threshold range. Further, the fit characteristics of the first ring are identified as the loosely fit when the capacitance shift and each pressure point is less than the predefined capacitance threshold value. Further, the fit characteristics of the first ring are identified as the perfectly fit when the capacitance shift and each pressure point is within a range of capacitance threshold value.

According to an embodiment, the processing unit 403 determines the fit characteristics with respect to the selected ring based on the evaluation of the capacitance shift and the plurality of pressure points. According to an embodiment, based on the fit characteristics, the processing unit 403 provides a response about the size of the ring. In an embodiment, the response to the user includes one of the loosely fit, the tightly fit, or the perfectly fit about the size of the ring. Consider, a scenario that the ring selected by the user is perfectly fit. Accordingly, the display panel 101 display as "Perfectly fit" as a response to the user. Alternatively, consider that the ring selected by the user is not perfectly fit and the fit characteristics is determined to be as loosely fit. In such a scenario, the display panel 101 display as "Loosely fit" as a response to the user. According to some embodiments, the display panel 101 of the android device displays the fit characteristics. For example, the display of the android device displays the perfectly fit, loosely fit, or tightly fit.

In an embodiment, in a scenario if the ring selected by the user for the first time is not perfectly fit and the fit characteristics is determined to be either loosely fit or tightly fit, then in that case, the processing unit 403 estimates, using the fit characteristics, another ring from the set of rings and recommend another ring (herein after referred to as a second ring) to the user for trial. In an embodiment, the processing unit 403 provides the recommendation via the user interface by displaying the same in the display panel 101.

In an embodiment, upon trial of the ring, the capacitive sensing ring-sizing system 100 shall go through the same process of determining the fit characteristics as explained in the above paragraphs. Accordingly, the receiving unit 401 receives the sensor data, from a capacitive sensor embeds in the second ring, upon trial of the second ring on the finger of the user. Further, based on the sensor data, the processing unit 403 measures the capacitance shift and the pressure at the plurality of pressure points with respect to the skin of the finger upon trial of the second ring. Further, the processing unit 403 evaluates the capacitance shift and the plurality of pressure points with respect to the predefined sizing parameters. Further, the processing unit 403 determines the fit characteristics with respect to the second ring based on the evaluation and provides, via the user interface, the response about the size of the second ring based on the fit characteristics.

Consider a scenario, that the fit characteristics with respect to the second ring are determined as perfectly fit. Then the display panel 101 displays the response as "Perfectly fit". Further, in a case the fit characteristics with respect to the second ring are determined as tightly fit, the display panel 101 displays the response as "Tightly fit". Accordingly, in the latter case if the fit characteristics with respect to the second ring are determined as tightly fit, then the processing unit 403 recommends another ring for trial. In an embodiment, upon trial of the ring, the capacitive sensing ring-sizing system 100 shall go through the same process of determining the fit characteristics as explained in the above paragraphs till a perfectly fit size is obtained for the user.

According to an embodiment, the capacitive sensing ring-sizing system 100 maintains a user profile. In an embodiment, profiles of the users who are using the capacitive sensing ring-sizing system 100 for determining the size of the ring will be maintained in the database or memory of the electronic system. In an embodiment, the database can be a cloud database or a local database.

FIG. 5 illustrates a method 500 implemented in the capacitive sensing ring-sizing system, according to an embodiment of the present disclosure. According to an embodiment, the method 500 is implemented in the capacitive sensing ring-sizing system 100. An explanation of the capacitive sensing ring-sizing system is explained through FIGS. 1 to 4 therefore a detailed explanation of the same is omitted here for the sake of brevity.

In an embodiment, at step 501, the receiving unit 401 includes receiving sensor data, from a capacitive sensor embeds in a first ring, upon trial of the first ring on a finger of a user. The first ring is selected by the user from a set of rings that is installed in a ring panel of the capacitive sensing ring-sizing system. Each ring of the set of rings is of different standard sizes and embeds with the capacitive sensor.

Further, at step 503, the processing unit 403 includes measuring a capacitance shift and a pressure at a plurality of pressure points with respect to a skin of the finger based on the sensor data. In an embodiment, the step 503 for measuring the capacitance shift of the finger includes determining a capacitance value with respect to a contact with the skin based on the sensor data. Further, the processing unit 403 includes measuring the capacitance shift based on a shift in the capacitance value with respect to an initial capacitance value. In an embodiment, the step 503 for measuring the pressure at the plurality of pressure points of the finger includes determining the pressure exerted on each of the plurality of pressure points of the finger based on the capacitance value at each pressure point. Further, the processing unit 403 include measuring the pressure at the plurality of pressure points of the finger based on the determination.

In an embodiment, at step 505, the processing unit 403 includes evaluating the capacitance shift and the plurality of pressure points with respect to the predefined sizing parameters. Further, at step 507, the processing unit 403 includes determining fit characteristics with respect to the selected first ring based on the evaluation of the capacitance shift and the plurality of pressure points.

In a particular, for evaluating the capacitance shift and the plurality of pressure points, the step 505, the processing unit 403 includes comparing the capacitance shift and the plurality of pressure points with respect to the predefined sizing parameters, where the predefined sizing parameters include a predefined capacitance threshold range. Further, the processing unit 403 includes determining a level of fit to determine the fit characteristics based on a result of the comparison. Further, processing unit 403 includes identifying whether the first ring is one of a loosely fit, a tightly fit, or a perfectly fit based on the fit characteristics.

In an embodiment, the fit characteristics of the first ring are identified as the tightly fit when the capacitance shift and each pressure point is more than the predefined capacitance threshold range. Further, the fit characteristics of the first ring are identified as the loosely fit when the capacitance shift and each pressure point is less than the predefined capacitance threshold range. Further, the fit characteristics of the first ring are identified as the perfectly fit when the capacitance shift and each pressure point is within the predefined capacitance threshold range.

Further, at step 509, the processing unit 403 includes providing, via the user interface, a response about the size of the first ring based on the fit characteristics. In an embodiment, the response to the user includes one of the loosely fit, the tightly fit, or the perfectly fit about the size of the first ring.

In an embodiment, based on the response that the size of the first ring is one of the loosely fit or the tightly fit, the processing unit 403 further includes estimating, using the fit characteristics, a second ring from the set of rings. Accordingly, the processing unit 403 includes recommending the second ring to the user for trial.

In an embodiment, the processing unit 403 includes measuring, based on the sensor data, the capacitance shift and the pressure at the plurality of pressure points with respect to the skin of the finger upon trial of the second ring. Further, the processing unit 403 includes evaluating the capacitance shift and the plurality of pressure points with respect to the predefined sizing parameters. Further, the processing unit 403 includes determining the fit characteristics with respect to the second ring based on the evaluation. Further, the processing unit 403 includes providing, via the user interface, the response about the size of the second ring based on the fit characteristics.

Thus, the disclosed unique capacitive sensing ring-sizing system provides precise fit with unmatched accuracy in identifying the ideal ring size. Further, an instant on-screen recommendations enhances user experience. The capacitive sensing ring-sizing system is scalable and can be deployed across retail outlets globally, enhancing brand value. The simplified implementation of the capacitive sensing ring-sizing system avoids the huge computation and heavy softwares. The capacitive sensing ring-sizing system can be applied across retail outlets, jewelry stores and the like.

FIG. 6 illustrates a general block diagram of capacitive sensing ring-sizing system, according to an embodiment of the present disclosure.

In an example, the MCU 601 may be a single processing unit or a number of units, all of which could include multiple computing units. The MCU 601 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, MCU 601 is configured to fetch and execute computer-readable instructions and data stored in a memory 603.

The memory 603 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

In an example, the unit(s) 607 may include a program, a subroutine, a portion of a program, a software component or a hardware component capable of performing a stated task or function. As used herein, the unit(s) 607 may be implemented on a hardware component such as a server independently of other modules, or a module can exist with other modules on the same server, or within the same program. The unit(s) 607 may be implemented on a hardware component such as processor one or more microprocessors, microcomputers, microcontrollers, digital signal processors, central processing units, state machines, logic circuitries, and/or any devices that manipulate signals based on operational instructions. The unit(s) 607 when executed by the MCU 601 may be configured to perform any of the described functionalities. According to an embodiment, the unit(s) 607 includes one or more units discussed above with reference to FIG. 4. In an alternate embodiment, the functions of the aforesaid modules may be performed by the MCU 601.

As a further example, the database 605 may be implemented with integrated hardware and software. The hardware may include a hardware disk controller with programmable search capabilities or a software system running on general-purpose hardware. Examples of databases are but are not limited to, in-memory databases, cloud databases, distributed databases, embedded databases, and the like. The database amongst other things, serves as a repository for storing data processed, received, and generated by one or more of the MCU 601.

As an example, the display unit 101 includes a computer monitor, a touch screen, an output device capable of displaying the graphics, and the like. The display unit 101 is configured to display visual output in desktops, laptops, and workstations. The display unit 101 may come in different sizes, resolutions, and types (such as LCD, LED, or OLED).

As a further example, the network interface 607 is configured to provide and establish communication with any electronic device via a public network, private network, or any wireless communication technology.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method implemented in a capacitive sensing ring-sizing system, the method comprising:
   receiving sensor data, from a capacitive sensor embeds in a first ring, upon trial of the first ring on a finger of a user, wherein the first ring is selected by the user from a set of rings that is installed in a ring panel of the capacitive sensing ring-sizing system, and each ring of the set of rings is of different standard sizes and embeds with the capacitive sensor;
   measuring a capacitance shift and a pressure at a plurality of pressure points with respect to a skin of the finger based on the sensor data;
   evaluating the capacitance shift and the plurality of pressure points with respect to a predefined sizing parameters;
   determining fit characteristics with respect to the selected first ring based on the evaluation of the capacitance shift and the plurality of pressure points; and
   providing, via a user interface, a response about the size of the first ring based on the fit characteristics.

2. The method as claimed in claim 1, wherein measuring the capacitance shift of the finger comprises:
   determining a capacitance value with respect to a contact with the skin based on the sensor data; and
   measuring the capacitance shift based on a shift in the capacitance value with respect to an initial capacitance value.

3. The method as claimed in claim 1, wherein measuring the pressure at the plurality of pressure points of the finger comprises:
   determining the pressure exerted on each of the plurality of pressure points of the finger based on the capacitance value at each pressure point; and
   measuring the pressure at the plurality of pressure points of the finger based on the determination.

4. The method as claimed in claim 1, wherein evaluating the capacitance shift and the plurality of pressure points comprises:
   comparing the capacitance shift and the plurality of pressure points with respect to the predefined sizing parameters, wherein the predefined sizing parameters include a predefined capacitance threshold range;
   determining a level of fit to determine the fit characteristics based on a result of the comparison; and
   identifying whether the first ring is one of a loosely fit, a tightly fit, or a perfectly fit based on the fit characteristics.

5. The method as claimed in claim 4, wherein
   the fit characteristics of the first ring are identified as the tightly fit when the capacitance shift and each pressure point is more than the predefined capacitance threshold range,
   the fit characteristics of the first ring are identified as the loosely fit when the capacitance shift and each pressure point is less than the predefined capacitance threshold range, and
   the fit characteristics of the first ring are identified as the perfectly fit when the capacitance shift and each pressure point is within the predefined capacitance threshold range.

6. The method as claimed in claim 4, wherein the response to the user includes one of the loosely fit, the tightly fit, or the perfectly fit about the size of the first ring.

7. The method as claimed in claim 6, based on the response that the size of the first ring is one of the loosely fit or the tightly fit, the method further comprising:
   estimating, using the fit characteristics, a second ring from the set of rings; and
   recommending the second ring to the user for trial.

8. The method as claimed in claim 7, further comprising:
   measuring, based on the sensor data, the capacitance shift and the pressure at the plurality of pressure points with respect to the skin of the finger upon trial of the second ring;
   evaluating the capacitance shift and the plurality of pressure points with respect to the predefined sizing parameters;
   determining the fit characteristics with respect to the second ring based on the evaluation; and
   providing, via the user interface, the response about the size of the second ring based on the fit characteristics.

9. A capacitive sensing ring-sizing system, comprising:
   a ring panel having a set of rings where each ring is of different standard sizes and embeds with the capacitive sensor;
   a receiving unit configured to receive sensor data from the each ring;
   a processing unit comprising one or more processors; and
   a display unit configured to display a user interface to a user, wherein the processing unit is configured to:
      receive the sensor data, from the capacitive sensor embeds in a first ring, upon trial of the first ring on a finger of the user, wherein the first ring is selected by the user from the set of rings that is installed in the ring panel;
      measure a capacitance shift and a pressure at a plurality of pressure points with respect to a skin of the finger based on the sensor data;
      evaluate the capacitance shift and the plurality of pressure points with respect to a predefined sizing parameters;
      determine fit characteristics with respect to the selected first ring based on the evaluation of the capacitance shift and the plurality of pressure points; and
      provide, via the user interface, a response about the size of the first ring based on the fit characteristics.

10. The capacitive sensing ring-sizing system as claimed in claim 9, for measuring the capacitance shift of the finger, the processing unit is configured to:
 determine a capacitance value with respect to a contact with the skin based on the sensor data; and
 measure the capacitance shift based on a shift in the capacitance value with respect to an initial capacitance value.

11. The capacitive sensing ring-sizing system as claimed in claim 9, wherein for measuring the pressure at the plurality of pressure points of the finger, the processing unit is configured to
 determine the pressure exerted on each of the plurality of pressure points of the finger based on the capacitance value at each pressure point; and
 measure the pressure at the plurality of pressure points of the finger based on the determination.

12. The capacitive sensing ring-sizing system as claimed in claim 9, wherein evaluating the capacitance shift and the plurality of pressure points, the processing unit is configured to:
 compare the capacitance shift and the plurality of pressure points with respect to the predefined sizing parameters, wherein the predefined sizing parameters include a predefined capacitance threshold range;
 determine a level of fit to determine the fit characteristics based on a result of the comparison; and
 identify whether the first ring is one of a loosely fit, a tightly fit, or a perfectly fit based on the fit characteristics.

13. The capacitive sensing ring-sizing system as claimed in claim 12, wherein
 the fit characteristics of the first ring are identified as the tightly fit when the capacitance shift and each pressure point is more than the predefined capacitance threshold range,
 the fit characteristics of the first ring are identified as the loosely fit when the capacitance shift and each pressure point is less than the predefined capacitance threshold range, and
 the fit characteristics of the first ring are identified as the perfectly fit when the capacitance shift and each pressure point is within a range of capacitance threshold range.

14. The capacitive sensing ring-sizing system as claimed in claim 12, wherein the response to the user includes one of the loosely fit, the tightly fit, or the perfectly fit about the size of the first ring.

15. The capacitive sensing ring-sizing system as claimed in claim 14, based on the response that the size of the first ring is one of the loosely fit or the tightly fit, the processing unit is configured to:
 estimate, using the fit characteristics, a second ring from the set of rings; and
 recommend the second ring to the user for trial.

16. The capacitive sensing ring-sizing system as claimed in claim 15, the processing unit is configured to:
 measure, based on the sensor data, the capacitance shift and the pressure at the plurality of pressure points with respect to the skin of the finger upon trial of the second ring;
 evaluate the capacitance shift and the plurality of pressure points with respect to the predefined sizing parameters;
 determine the fit characteristics with respect to the second ring based on the evaluation; and
 provide, via the user interface, the response about the size of the second ring based on the fit characteristics.

* * * * *